United States Patent
Caudill

(10) Patent No.: US 10,211,913 B2
(45) Date of Patent: *Feb. 19, 2019

(54) SYSTEMS AND METHODS FOR SATELLITE COMMUNICATIONS USING A SPACE TOLERANT PROTOCOL

(71) Applicant: Spire Global, Inc., San Francisco, CA (US)

(72) Inventor: Harrison Caudill, San Francisco, CA (US)

(73) Assignee: SPIRE GLOBAL, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/661,011

(22) Filed: Jul. 27, 2017

(65) Prior Publication Data

US 2017/0366252 A1 Dec. 21, 2017

Related U.S. Application Data

(63) Continuation of application No. 15/188,079, filed on Jun. 21, 2016, now Pat. No. 9,755,732.

(51) Int. Cl.
*H04W 4/00* (2018.01)
*H04B 7/185* (2006.01)

(52) U.S. Cl.
CPC ....... *H04B 7/18582* (2013.01); *H04B 7/1858* (2013.01); *H04B 7/18586* (2013.01); *H04B 7/18597* (2013.01)

(58) Field of Classification Search
CPC .............. H04B 7/18582; H04B 7/1858; H04B 7/18597

(Continued)

(56) References Cited

U.S. PATENT DOCUMENTS

| 5,410,728 A | 4/1995 | Bertiger et al. |
| 5,604,920 A | 2/1997 | Bertiger et al. |

(Continued)

FOREIGN PATENT DOCUMENTS

EP 1037405 A2 9/2000

OTHER PUBLICATIONS

Carson-Jackson ("Satellite AIS—Developing Technology or Existing Capability?", The Journal of Navigation ;2012), 65, 303-321).

*Primary Examiner* — Amancio Gonzalez
(74) *Attorney, Agent, or Firm* — Troutman Sanders LLP

(57) ABSTRACT

A method is provided that can include designating as a control node, a first communication node of a plurality of communication nodes associated with a satellite communications system. The method can include, designating as a listening node, a second communication node of the plurality of communication nodes. The listening node is responsive to instructions provided by the control node. The method includes receiving, at a tuning module, one or more input tuning factors, wherein the one or more input tuning factors can include at least a resource burden factor. Responsive to receiving the one or more input tuning factors, the method includes adjusting by the tuning module, one or more tunable output parameters. The method includes sending, from the control node to the listening node, instructions comprising one or more of the tunable output parameters, and executing the instructions at the listening node.

20 Claims, 8 Drawing Sheets

(58) Field of Classification Search
USPC .......................................................... 455/427
See application file for complete search history.

(56) References Cited

U.S. PATENT DOCUMENTS

| | | | |
|---|---|---|---|
| 5,910,945 A | 6/1999 | Garrison et al. | |
| 5,940,739 A | 8/1999 | Conrad et al. | |
| 5,963,166 A | 10/1999 | Kamel | |
| 6,067,453 A | 5/2000 | Adiwoso et al. | |
| 6,271,877 B1 | 8/2001 | LeCompte | |
| 6,381,228 B1 | 4/2002 | Prieto, Jr. et al. | |
| 6,584,452 B1 | 6/2003 | Prieto, Jr. et al. | |
| 7,079,505 B2 | 7/2006 | Okunishi et al. | |
| 8,411,969 B1 | 4/2013 | Joslin et al. | |
| 9,755,732 B1* | 9/2017 | Caudill | H04B 7/18582 |
| 9,769,785 B2* | 9/2017 | Skaaksrud | H04W 12/06 |
| 9,798,996 B2* | 10/2017 | Borgerson | G06Q 10/0831 |
| 2003/0217362 A1 | 11/2003 | Summers et al. | |
| 2004/0263386 A1 | 12/2004 | King et al. | |
| 2007/0182628 A1 | 8/2007 | Pomerantz et al. | |
| 2008/0071633 A1 | 3/2008 | Ozkan et al. | |
| 2009/0007240 A1 | 1/2009 | Vantalon et al. | |
| 2012/0018585 A1 | 1/2012 | Liu et al. | |
| 2013/0018529 A1 | 1/2013 | Ploschnitznig | |
| 2016/0112117 A1* | 4/2016 | Platzer | H04B 7/18513 370/316 |
| 2017/0234962 A1* | 8/2017 | Yang | G01S 5/0252 342/465 |

* cited by examiner

SYSTEMS AND METHODS FOR SATELLITE COMMUNICATIONS USING A SPACE TOLERANT PROTOCOL

RELATED APPLICATIONS

This application is a continuation application of U.S. patent application Ser. No. 15/188,079, filed 21 Jun. 2016, the contents of which are incorporated by reference as if presented in full.

This application is also related to U.S. patent application Ser. No. 13/961,384, filed 7 Aug. 2013, entitled "System and Method for High-Resolution Radio Occultation Measurement Through the Atmosphere," and published as U.S. Patent Publication US 2015/0192696 on 9 Jul. 2015, the contents of which are incorporated by reference as if presented in full.

FIELD

This disclosed technology relates to reliable satellite communications, and more particularly, to systems and methods for communications using a space tolerant protocol.

BACKGROUND

A number of challenges exist in providing reliable communications among and between ground stations and satellites, particularly in communication systems that employ small satellites having limited power. High bit-error-rates (or even complete communication failure) can result when scarce resources are not properly utilized and/or when sources of interference are not properly managed. For example, limited battery and solar power on a satellite can limit the available radio frequency (RF) power for radio transmission of data, which can result in a low signal-to-noise ratio and a corresponding high bit-error-rate. Furthermore, the communications link between ground stations and orbiting satellites have limited time-windows that can vary in noise/reliability as a function of interference sources, satellite azimuth and elevation angles with respect to the ground station, etc. In addition, the process of attempting to receive data while simultaneously transmitting can overwhelm the receiver. Thus, a number of factors associated with satellite communications can cause data to be delayed, received out of order, received with a high error rate, and/or lost.

Certain networking communication protocols, such as the OSI five layer networking stack, have been developed and successfully utilized for terrestrial data communications, but such protocols do not always work well for small satellite communications. Many satellite communication systems instead use a modified networking stack known as Cubesat Space Protocol (CSP), comprehensively documented, and published by GomSpace. The CSP protocol follows the TCP/IP model and includes transport and routing protocols. Unfortunately, certain layers available in CSP may not be ideal for certain satellite communication schemes.

TCP/IP protocols used in terrestrial networking guarantees/requires delivery and order of delivery. CSP employs a Reliable Datagram Protocol (RDP), which is a simplified version of TCP based on RFC 1151. Like TCP, RDP requires maintenance of synchronization of sequence numbers between the satellite and the ground station, resulting in frequent delays and protocol errors due to lost packets and protocol complexity. In a half-duplex, high-data-loss environment, such as ground to satellite communications, this method may be completely unworkable. For instance, not all packets may be received in a high loss environment, which would result in the transmitting node continuing to transmit packets long after the pass has completed, resulting in extremely dire consequences, such as the satellite completely discharging its batteries in an attempt to continue transmitting. In addition, a handshake needs to be initiated, typically from the ground station side. Constant protocol synchronization using ACK messages are also required. These would require all ground stations to be capable and licensed to transmit, which is not always the case, as some ground stations are "receive only" for logistical or legal reasons.

As a further example, RDP requires that the ground station and satellite maintain a shared state in which they are synchronized, via handshakes and/or acknowledgements. Should either the ground or satellite side fail to transmit "ACK" and/or the other side fail to receive the "ACK," no data transmission can occur until a timeout occurs.

As a further example, in certain situation, both nodes may need to terminate a communication or essentially "sign off" and hear the other side sign off. If one node does not hear the other node "sign off," then it would continue to be stuck in transmission. Such a shared state can occur, for example, in the maintenance of sequence numbers. However, the shared state is impracticable in a half-duplex system where only one node can transmit at one time. A need exists for improved systems and methods to address such issues and challenges.

BRIEF SUMMARY

Some or all of the above needs and other problems not listed above may be addressed by certain implementations of the disclosed technology. Certain implementations of the disclosed technology may include systems and methods for a flexible networking protocol stack that greatly mitigates certain issues associated with satellite communications.

In accordance with an example implementation of the disclosed technology, a method is provided that can include designating as a control node, a first communication node of a plurality of communication nodes that are associated with a satellite communications system. The method further includes designating as a listening node, a second communication node of the plurality of communication nodes responsive to the designated control node. The listening node is responsive to instructions provided by the control node. The method can include receiving, at a tuning module associated with a satellite communications system, one or more input tuning factors, wherein the one or more input tuning factors include at least a resource burden factor. Responsive to receiving the one or more input tuning factors, the method includes adjusting by the tuning module, one or more tunable output parameters. The method includes sending, from the control node to the listening node, instructions including one or more of the tunable output parameters. The method can further include executing the instructions at the listening node.

According to another example implementation, a satellite communications system is provided. The system includes a plurality of communication nodes that include at least one node associated with a satellite. The system includes a memory for storing data and computer-executable instructions; and at least one processor in communication with the at least one memory. The at least one processor is further configured to execute the computer-executable instructions to cause the system to: designate as a control node, a first communication node of the plurality of communication nodes; designate as a listening node, a second communication node of the plurality of communication nodes, wherein the second communication node is different from the first communication node, and wherein the listening node is configured to be responsive to instructions provided by the control node; receive, at a tuning module associated with the memory, one or more input tuning factors, wherein the one or more input tuning factors comprise at least a resource burden factor; adjust, by the tuning module, one or more tunable output parameters in response to the received input tuning factors; send, from the control node to the listening node, instructions comprising one or more of the tunable output parameters; and execute the instructions at the listening node.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
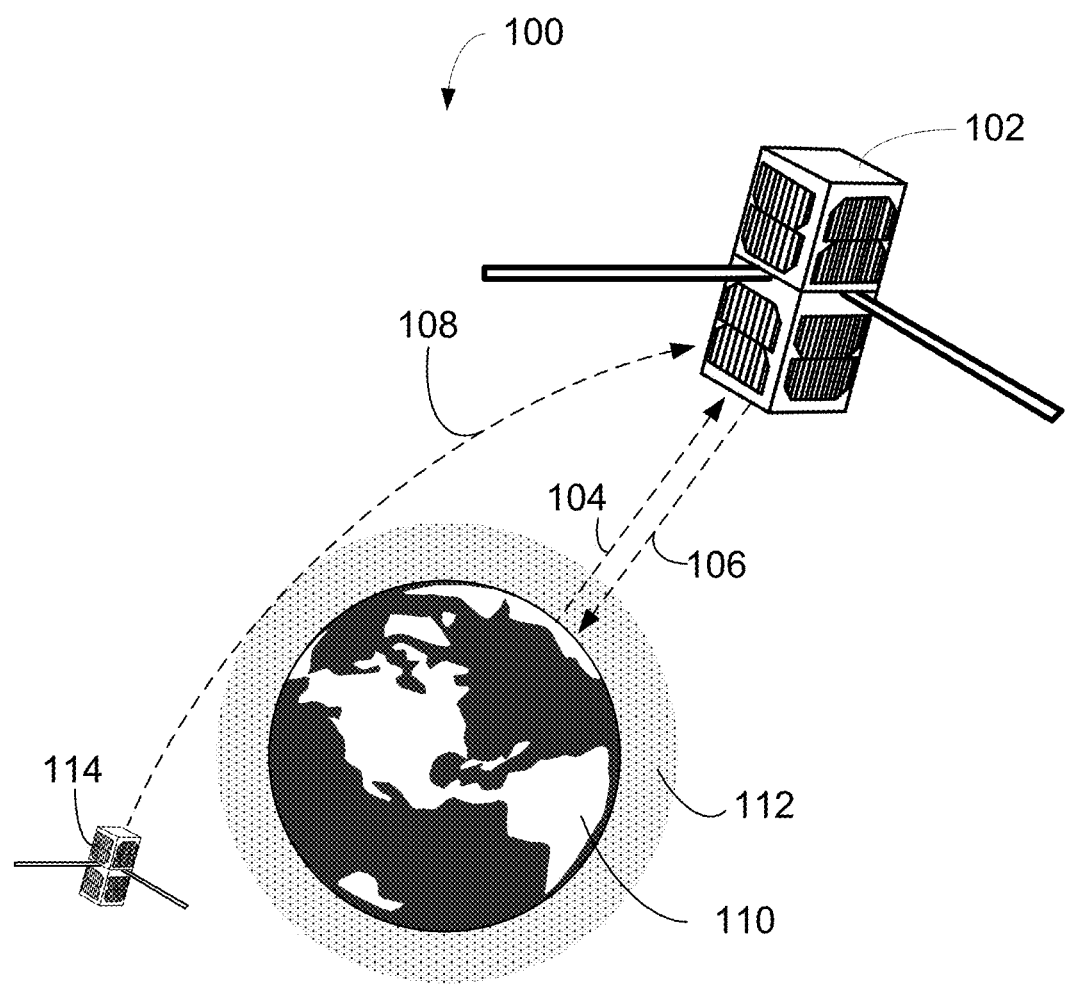
FIG. 1 depicts an example satellite communications system 100, according to an example implementation of the disclosed technology.

Some implementations of the disclosed technology will be described more fully hereinafter with reference to the accompanying drawings. This disclosed technology may, however, be embodied in many different forms and should not be construed as limited to the implementations set forth herein.

Certain implementations of the disclosed technology include systems and methods that utilize a space tolerant protocol (STP) having a unidirectional link, which in certain example implementations may be dynamically configurable and re-configurable, as needed. Certain example implementations of the STP may be configured in a satellite communications link such that one component in the link is designated as a control node, and other component is designated as a listening node. For example, the listening node does not take any independent action or perform independent asynchronous radio operations without instructions from the control node. In accordance with an example implementation of the disclosed technology, (and as will be discussed with reference to FIG. 7A and FIG. 7B) a control node in the communication link provides instructions, while a listening node listens for and receives the instructions. In certain example implementations, the logic for which operation should occur next, and under what circumstances the operation should occur, remains entirely under the control of the control node in the link. Accordingly, certain example implementations can eliminate the problem of the "shared state," as can occur in the Reliable Datagram Protocol (RDP) associated with the CubeSat Space Protocol (CSP).

In accordance with certain example implementations of the disclosed technology, the control node can be designated to reside either on the satellite or on the ground station. In certain example implementations, the control node may be virtually transferred from the ground station to the satellite, or vice versa as needed. In one example implementation, the control node may be defined by (or in) a processor at, or associated with the satellite. Thus, the control node initiates and/or controls the STP. In certain example implementations, is not necessary for the control node to be located with the ground station. In other words, satellites can operate with no external instruction. For example, a satellite can be programmed to prepare itself for data transmission via a previous command received from a ground station. In certain example implementations, a satellite can be programmed to transmit on a given schedule without requiring a command from the ground station to initiate a transmission. Such embodiments may be particularly valuable for communication with ground stations that are "receive only" and cannot issue commands.

In accordance with certain example implementations of the disclosed technology, signals that are transmitted by a ground station (or other terrestrial transmitter) and received by a satellite are designated herein as upload signals. Conversely, signals that are transmitted by a satellite and received by a ground station (or other terrestrial receiver) are designated herein as download signals.

Continuous Polling

In certain satellite communications links in which the conventional Reliable Datagram Protocol (RDP) is employed, acknowledgements are typically received in response to transmitted data and control messages. Such acknowledgements in the RDP can provide an indication that the transmitted data and control messages were received and that a communication sequence can continue. In some satellite communication systems, particularly in power-limited or half-duplex systems for which the technology disclosed herein may apply, the extra communications overhead associated with the acknowledgements can use up valuable battery power and can take up valuable communication window time. In some situations, communications can be delayed and/or completely stalled if the acknowledgement is not received due to any number of issues, such as noise.

Certain example implementations of the disclosed technology may be utilized to address and overcome some of the drawbacks, as indicated above, with respect to reliance on acknowledgements. In an example implementation, continuous polling may be utilized. Thus, according to an example implementation of the disclosed technology, instead of waiting for a response from the listening node (as may be the case under RDP), the control node may continuously poll (send) the listening node with the applicable instruction (for example, requesting data) until the control node receives the requested data. In an example implementation, long polling may be utilized. For example, long polling may be utilized to poll a node to request new information. In certain example implementations, the node may keep the request open until new data is available.

In one example implementation of the disclosed technology, a ground station may be designated as the control node and the satellite may be designated as the listening node. In such an example implementation, the ground station may continuously poll the satellite for data until the data is received by the ground station (for example, via a download signal). In certain example implementations, the ground station may poll the satellite according to a schedule (for example, via an upload signal) for requested data until the requested data is received at the ground station. The scheduled polling may be employed, for example, in situations where the transmitted polling signal may adversely affect the receiver on the same side of the communications link.

Conversely, in certain example implementations, a satellite may be designated as the control node and the ground station may be designated as the listening node. In such an example implementation, the satellite may continuously poll the ground station for data (via a download signal) until the data is received (via an upload signal) by the satellite. In certain example implementations, the satellite may poll the ground station for requested data based on a schedule until the requested data is received. Additional example regarding the designation of the control and listening nodes will be discussed below with respect to FIG. 7A and FIG. 7B.

Tuning

Certain example implementations of the disclosed technology may include the use of a Space Tolerant Protocol (STP) for satellite communications. According to an example implementation of the disclosed technology, the STP may be tunable and may allow adjustment of certain parameters to provide improvements in flexibility as compared with traditional CubeSat protocols and/or general satellite protocols over noisy or imperfect communication links. For example, in one implementation, the STP may include and/or utilize an adjustable data packet size. In an example implementation, the STP may include and/or utilize an adjustable data chunk size. In an example implementation, the STP may include and/or utilize an adjustable data coding rate. In an example implementation, the STP may include and/or utilize an adjustable number of re-transmits on uplink. In an example implementation, the STP may include and/or utilize an adjustable number of timeouts. For example in one implementation, the system may be set to tolerate a predetermined number of timeouts (for example, 30 timeouts) before taking predetermined alternative action.

In an example implementation, the STP may include and/or utilize an adjustable maximum transmission time. In an example implementation, the STP may include and/or utilize an adjustable data compression parameters (for example, the algorithm type, window, etc.) to achieve desired or optimal behavior for the given circumstances.

Certain example implementations of the disclosed technology may be further utilized to provide adjustable data coding rates. For example, forward error correction (FEC) frequently involves a fixed coding-rate system, such as 223,255 RS coding. The disclosed technology may enable variable coding rates that can be effectively accomplished in multiple ways. For example, in one implementation, a data chunk can be coded at a coding rate of, for example, 2 (meaning that for each byte of payload data, there is 1 byte of payload data+1 byte of parity=2 bytes=2× the total data amount). The amount of data transmitted per code-block can be varied to effectively produce a varying coding-rate depending upon expected packet-loss rates. Additionally, rateless codes (fountain codes) can be utilized which permit transmission of a variable amount of total data representing a given amount of payload data.

Certain example implementations of the disclosed technology may be utilized to affect and/or improve communications efficiency associated with satellite communications. Factors that can affect communications efficiency can include, but are not limited to bit-rate, resource burden, and recoverability. For example, the bit-rate factor can include actual or effective speeds at which data downloads and/or uploads may be obtained. Many factors can influence the effective bit-rate, including but not limited to noise, re-transmission of data due to errors, transmit power, error correction encoding/decoding, etc. Certain example implementations of the disclosed technology provide a flexible communication protocol that can improve communications efficiency via improvements in the bit-rate.

The resource burden factor, in terms of its contribution to communications efficiency, can be defined in terms of a percentage use of an available resource. For example, a satellite may include a battery with a limited amount of stored power for peak, continuous, and/or intermittent operation of on-board processors, receivers, and transmitters. Certain example implementations of the disclosed technology provide a flexible communication protocol that can account for the limited resources for efficient use. In another example implementation, a given receiver may be capable of receiving communications from a plurality of transmitters operating at different times. However, the receiver may become "overburdened" by multiple simultaneous transmission streams. In terms of data processing resources, such resource burden can be affected by a high volume of data, data surges, data congestion, and/or multiple handshakes/acknowledgements. Certain example implementations of the disclosed technology may help manage some of the burdens placed on the available resources.

The recoverability factor can have a significant contribution in terms of communications efficiency. Recoverability, in this sense, can generally be defined as the ability to recover or reproduce data that has been corrupted or lost (for example, due to noise or partial transmission) during the communications process. For example, depending on the encoding, forward error correction (FEC) with redundant packets can take up a significant percentage of available bandwidth in a satellite communications link. Certain example implementations of the disclosed technology provide a flexible communication protocol that can balance certain trade-offs with respect to recoverability. Certain implementations may adjust data redundancy and/or encoding to achieve target recoverability, for example, based on other factors such as noise, limited communications window, timeliness of the data, importance of the data, etc.

Automatic Identification System

Certain example implementations of the tunable Space Tolerant Protocol (STP) may be applied to improve Automatic Identification Systems (AIS). In general, AIS can be used by ocean vessels/ships to actively broadcast information about their heading, speed, location, and other information, which can allow companies, governments, and other interested parties to plot the ship's course, avoid collision with other ships and reefs, monitor ship-related activity, and to aid in accident investigation and in search and rescue operations. Satellite based AIS (S-AIS), for example, utilizes data received by a satellite for identifying, locating, and/or tracking ships at sea.

The AIS standard defines 27 different message types. For example, message type 18 delivers the position report (including longitude, latitude, navigation status, etc.) and is sent every 30 second to 3 minutes depending on the speed of the ship. Message type 24 provides the static report (type of ship, name, dimension, cargo type, etc.) and is sent every 6 minutes. Message type 14 is a safety-related broadcast message (and alerts of emergencies such as crew or passengers falling over-board).

One of the fundamental challenges for AIS satellite operators is the ability to receive and retransmit AIS signals with low latency (i.e., delay) so that accurate and up-to-date location information can be provided. There is also an inherent issue within the AIS standard: the TDMA radio access scheme (as defined in the AIS standard) creates 4,500 available time-slots in each minute for which message collisions can occur. If the satellite cannot process the messages, critical location information can be delayed.

Certain example implementations of the disclosed technology provide a flexible communication protocol that can provide low latency in the application of S-AIS. In one example implementation, latency can be reduced by selectively configuring the communication link to process different sizes of received AIS data and/or to set a compression window size.

In an example implementation, a vessel at sea may transmit AIS data, which may be picked-up by a remote sensing satellite for subsequent download to a ground station. The satellite may receive and store the uploaded AIS data. Prior to downloading the data to a ground station, the satellite may receive instructions for how to prepare the data for download. Such instructions may take into account the various factors as described above, such as bit-rate, resource burden, and recoverability. Furthermore, as previously described, the instructions for preparing the data may come from a control node. For example, in one example implementation, the control node may be a processor on the satellite. In another example implementation, the control node may reside at the ground station. In yet another example implementation, the control node may reside at another satellite.

In accordance with an example implementation of the disclosed technology, and based on the instructions for preparing the data, the data for download may be compressed, chunked, packetized, and/or encoded with forward error correction. Certain example implementations may determine the optimal data characteristics for the given transmission, and packets may be tuned for the maximum transmission unit (MTU) of the given network link. For example, small chunk data sizes and/or small compression windows may be utilized for processing and transmitting the AIS data.

Chunked transfer encoding is a data transfer mechanism in which data is sent in a series of "chunks" and the transmitting end does not need to know the length of the content before it starts transmitting. For example, the transmission can include dynamically-generated content before knowing the total size of that content. In an example implementation, an indication of the size of each chunk may be sent before sending the chunk itself so that the receiver can tell when it has finished receiving data for that chunk. In certain example implementations, the data transfer may be terminated by a final chunk of length zero.

According to certain example implementations of the disclosed technology, the various parameters associated with one or more of compression, chunk size, packet size, and/or error correction may be tuned to optimize certain metrics, such as latency. Certain example implementations may tolerate a higher loss of some data and perform partial recovery to get partial data, which may still be useful.

In accordance with an example implementation of the disclosed technology, a protocol may be utilized where a "chunk" is defined as the smallest unit of data that is guaranteed to be successfully recovered. If, for example, AIS messages are being transmitted, where subsets of the data are useful and the communication system is operating in a receive-only set of circumstances where missing chunks cannot be easily requested, smaller chunk-sizes permit higher partial-recoverability of lossy transmissions. Because compression also inhibits partial recoverability, the compression window becomes important. If, for example, a Burrows-Wheeler transform is used in the compression, then the entire compression window must successfully received to make use of any of the data.

GPS-RO

GPS Radio Occultation (GPS-RO) is a technique for measuring properties of the Earth's atmosphere from space, and it can be used for weather forecasts, climate modeling, and space weather prediction, as described in U.S. Patent Publication No. US2015/0192696, incorporated herein by reference. For example, a GPS-RO satellite can receive a radio signal transmitted by a GPS satellite in medium Earth Orbit. Depending on the density of the atmosphere through which the transmitted signal travels, the transmitted signal can be "bent" towards the earth to travel a longer path through the atmosphere, and the bending angle can be calculated based on the delay in the signal's arrival. The bending angle can be used to calculate the atmospheric density along the signal's path, which in turn can be used to calculate temperature, pressure, humidity and electron density.

In an example implementation, a satellite may receive and store the GPS data. In certain example implementations, an on-board processor may calculate the bending angle based on the delay in the signal's arrival. In a similar process as previously described with respect to processing AIS data, prior to downloading the GPS-RO data to a ground station, the satellite may receive instructions for how to prepare the data for download. Such instructions may take into account the various factors as described above, such as bit-rate, resource burden, and recoverability. Furthermore, as previously described, the instruction for preparing the data may come from another node. For example, in one example implementation, the control node may be a processor on the satellite. In another example implementation, the control node may be a processor on the ground station. In yet another example implementation, the control node may reside at another satellite.

In accordance with an example implementation of the disclosed technology, and based on the instructions for preparing the data, the data for download may be compressed, chunked, packetized, and/or encoded with forward error correction. Certain example implementations may determine the optimal data characteristics for the given transmission, and packets may be tuned for the maximum transmission unit (MTU) of the given network link. For example, large chunk data sizes and/or large compression windows may be utilized for processing and transmitting the GPS-RO data. According to certain example implementations of the disclosed technology, the various parameters associated with one or more of compression, chunk size, packet size, and/or error correction may be tuned to optimize certain metrics, such as download speed. In accordance with an example implementation of the disclosed technology, the STP may process GPS-RO information using a large compression windows and large chunk sizes, which would likely take less time to download but would be less capable of partial recovery. This may be advantageous as partial recoverability of a GPS-RO profile is of little value, while partial recoverability of an AIS message is of value. In certain example implementations, larger compression windows and larger chunk-sizes can lead to more efficient coding and compression, which means that fewer total bytes are necessary to transmit, and the benefits of FEC are increased.

Advanced Filtering and Active Control

Certain example implementations of the STP may utilize an advanced filtering algorithm. In one example implementation, the advanced filtering algorithm may utilize historic packet error rates as input, and it may produce an output of an expected future error rate on the next transmission. Accordingly, example implementations of the disclosed technology may enable adjusting the number of extra packets to be transmitted based on expected (future) packet error rates. Certain example implementations of the disclosed technology may dynamically adjust forward error correction parameters based on the expected packet error rates.

In an example implementation, one or more models may be utilized to calculate (a) the probability that a request was not received based on the number of packets received versus those requested; (b) the estimation of packet error rate; and/or (c) the estimation of time a request will take to be fulfilled versus actual time elapsed. For example, based on the one or more models, the control node can decide whether to re-instruct the satellite to transmit. In another example implementation, and based on the one or more models, the satellite may determine to stop transmitting. In certain example implementations, one or more of the model(s), associated processor(s), and/or the control node may be located either on the ground station side or on the satellite side.

Batching and Resuming

In accordance with certain example implementations, the STP as disclosed herein may be configured to handle various situations that may otherwise result in data transfer errors or failure. For example, the STP may be configured to handle situations such as interruption of the transmission, failure at the receiving node, failure at the transmitting node, significant data packet loss, and/or factors that cause unusable data. Certain example implementations of the STP may enable the transfer of useable data in such situations. For example, certain implementations may determine where an interruption occurred in the data stream. Certain example implementations may resume or retransmit beginning at a point in the data stream before the interruption. Certain example implementations may utilize information from the listening node to resume data transfer. For example, the listening node may be configured to account for the data expected vs. the data it has received. In certain example implementations, and based on this accounting of data expected vs. data received, the listening node can determine what needs to be re-transmitted. In certain example implementations, both instructions and downloads of data may be sent in bulk. In certain example implementations, downloads may be performed in bulk to minimize the required coordination between the ground and the sky. For operations performed in bulk, the ratio of bulk-transfer to request-overhead may dominate the overall efficiency of the system. Thus, in certain example implementations, the larger the group of data being requested, the more favorable that ratio becomes.

According to an example implementation of the disclosed technology, certain techniques may be utilized for effective satellite communications of digital data via a wireless communication channel. Certain implementations of the disclosed technology may be utilized to solve certain challenges in certain satellite communication systems by application of a protocol that provides configurability and flexibility. Certain example implementations will now be discussed in detail with reference to FIGS. 1-8.

FIG. 1 depicts an example satellite communications system 100, for which certain example embodiments of the disclosed technology may be applied. The system 100 includes a satellite 102 having a receiver and a transmitter. In one example implementation, the receiver may be configured for receiving an upload signal 104 from a ground station or other terrestrial transmitter. For example, the upload signal 104 may include an AIS system that is transmitted from a ship at sea, as described previously. In certain example implementations, the upload signal 104 may originate from a ground station on earth 110. In one example implementation, the ground station may be designated as the control node, and may upload instructions to the satellite 102 via the upload signal 104. In some embodiments, the ground station may be "receive" only, and thus may only receive download signals 106 from the satellite 102. In this case, the control node may reside at the satellite 102, or at another ground station that is capable of transmitting upload information to the satellite 102.

FIG. 1 also depicts an example embodiment of a GPS-RO configuration, as previously described, in which a GPS satellite 114 may transmit a GPS signal 108 though a portion of the earth's atmosphere 112. In certain example implementations, the receiving satellite 102 may be configured to receive the GPS signal 108 and send a corresponding download signal 106 to a ground station. In one example implementation, the received GPS signal 108 may be processed at the satellite 102 to calculate delay due to the effects of the atmosphere 112 (as previously described) and the corresponding results may be transmitted via the download signal 106 to the ground station. In another example implementation, the satellite 102 may re-transmit all or part of the received GPS signal 108 to the ground station, for subsequent processing at the ground station.

Figure 2:
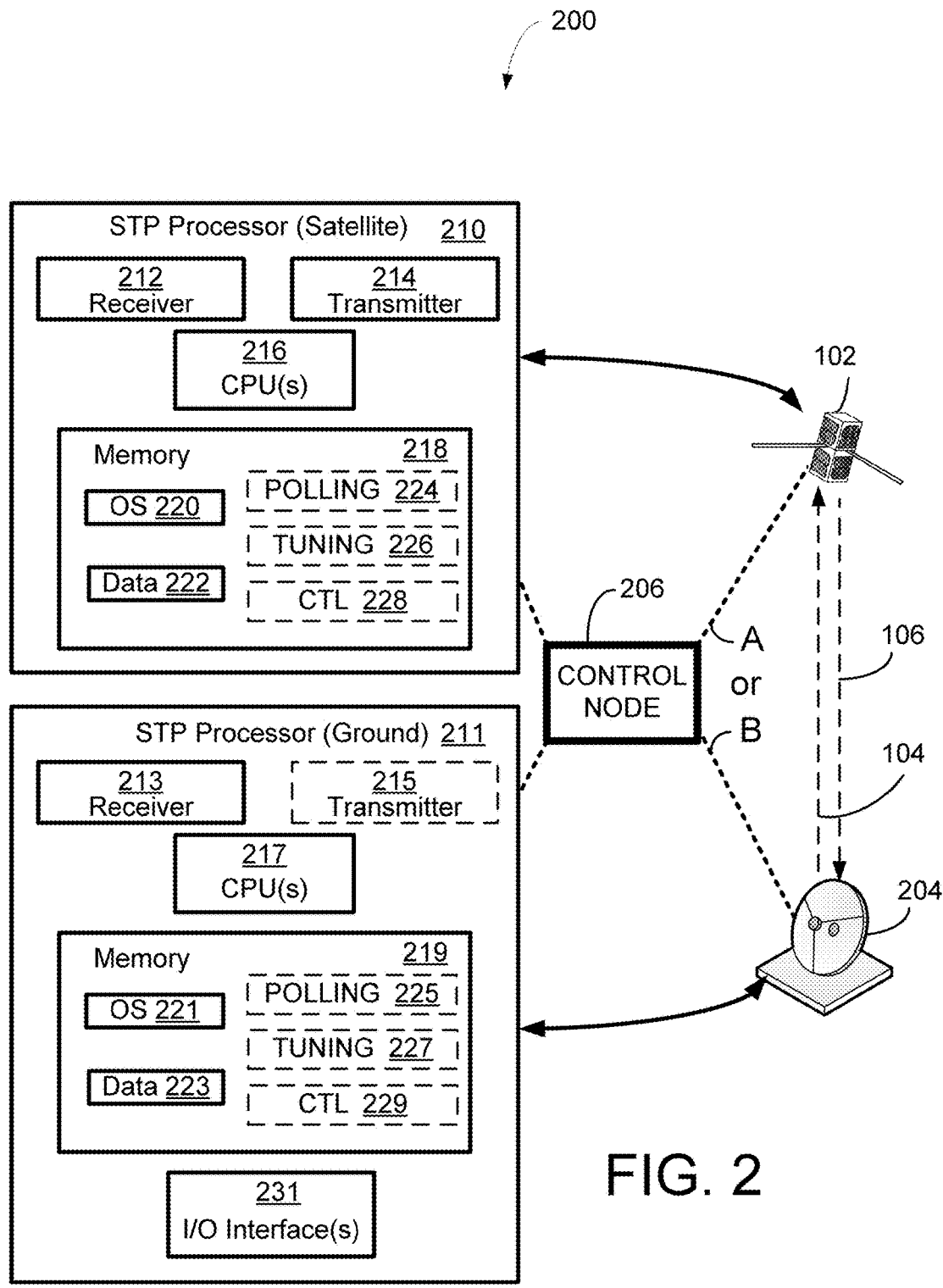
FIG. 2 depicts an example Space Tolerant Protocol (STP) system 200, according to an example implementation of the disclosed technology.

FIG. 2 depicts an example Space Tolerant Protocol (STP) system 200, according to an example implementation of the disclosed technology. The system 200 can include a ground station 204 that is configured to receive download signals 106 from a satellite 102 (such as the satellite 102 shown in FIG. 1). In certain example implementations, the ground station 204 may also be configured to transmit upload signals 104 to the satellite 102. According to an example implementation of the disclosed technology, the term "ground station" may designate a terrestrial transmitter, such as on a ship, or vehicle, and is not necessarily limited to being placed on the ground, but it can be placed on the ground in a stationary configuration. In other example implementations, the ground station 204, as represented in FIG. 2, may be substituted by another satellite. FIG. 2 is provide for explanation purposes and is not intended to limited the disclosed technology to the components shown or described.

In accordance with an example implementation of the disclosed technology, either or both of the upload signals 104 and the download signals 106 may be subjected to noise that can degrade signal-to-noise ratio, resulting in errors such as flipped bits, dropouts, etc. The noise can be introduced by a number of sources or factors such as atmospheric turbulence, low elevation angles, intermodulation noise, and interference from other transmitters, etc. In certain example implementations, either or both of the upload signals 104 and the download signals 106 may be subjected to interruptions resulting in extended periods of unusable or missing data.

FIG. 2 depicts the flexible designation of the control node 206 in the system 200. For example, the control node 206 can be selectively configured to be associated (A) with the satellite 102, or (B) with the ground station 204, as indicated, but not at both at the same time. In certain example implementations, the control node 206 can be dynamically configured at either (A) the satellite 102, or (B) the ground station 204. For example, dynamic configuration of the control node 206 may be passed back-and-forth as needed. As may be understood, when the satellite 102 (or a processor at the satellite) is designated as the control node 206, the ground station 204 may be configured as the listening node, and vice versa.

In an example implementation of the disclosed technology, and to facilitate the selective/dynamic configuration/placement of the control node 206 at either the satellite 102 or at the ground station 204, an STP processor 210 may be installed at the satellite 102, with a similar STP processor 211 installed at the ground station 204. In certain example implementations, the STP processor 210 at the satellite 102 may share certain similar characteristics with the STP processor 211 at the ground station 204, for example, to enable the flexible, selective, and/or dynamic configuration/placement of the control node 206 at either location in the system 200.

In an example implementation, the STP processor 210 at the satellite 102 can include a receiver 212 for receiving upload signals 104. In an example implementation, the STP processor 210 at the satellite 102 can include a transmitter 214 for transmitting download signals 106. The STP processor 210 may include one or more central processing units (CPU) 216 in communication with a memory 218. In certain example implementations, the memory 218 may be configured to store an operating system 220 and data 222. In certain example implementations, the memory 218 can include and/or may be in communication with various modules that are configured to process the upload signal 104 that is received by the receiver 212, and/or the download signal 106 for transmission by the transmitter 214. For example, in one implementation, the STP processor 210 at the satellite 102 can include one or more of a polling module 224, a tuning module 226, and a control module 228. The polling module 224, for example, may provide the continuous (or scheduled) polling, as previously described. The tuning module 226 may dynamically adjust the various parameters, such as one or more of: data packet size; data chunk size; data coding rate; number of re-transmits on uplink; number of tolerated timeouts; maximum transmission time; data compression parameters; bit rate factors; recovery factors; resource burden factors; batching; latency control; advance filtering; etc., as previously described. In certain example implementations, the control module 228 may be utilized to coordinate the designation, configuration, and handoff of the control node 206 functions and the corresponding listening node functions. In other example implementations, the control module 228 may provide one or more of data preparation, batching, encoding for error correction, and/or transmit scheduling, as will be discussed with reference to FIG. 6.

In accordance with an example implementation of the disclosed technology the STP processor 211 at the ground station 204 can include similar components as described above with respect to the STP processor 210 at the satellite 102. For example, the STP processor 211 at the ground station 204 can include a receiver 213 for receiving download signal 106. In certain example implementations, STP processor 211 at the ground station 204 can include a transmitter 215 for transmitting upload signals 104. In some implementations, the ground station 204 may be "receive only" and therefore, the transmitter 215 may be optional, as indicated by the dashed box.

The STP processor 211 may include one or more central processing units (CPU) 217 in communication with a memory 219. In certain example implementations, the memory 219 may be configured to store an operating system 221 and data 223. In certain example implementations, the memory 219 can include and/or may be in communication with various modules that are configured process the upload signal 104 for transmission by the transmitter 215 (if applicable) and/or to process the download signal 106 received by the receiver 213. For example, in one implementation, the STP processor 211 at the ground station 204 can include one or more of a polling module 225, a tuning module 227, and a control module 229, with similar functions as described above in the corresponding modules 224 226 228 in the STP processor 210 at the satellite 102. In certain example implementations, the STP processor 211 at the ground station 204 may include one or more I/O interfaces 231 for further input and/or output of commands, data, etc., as will be explained below with respect to FIG. 3.

Figure 3:
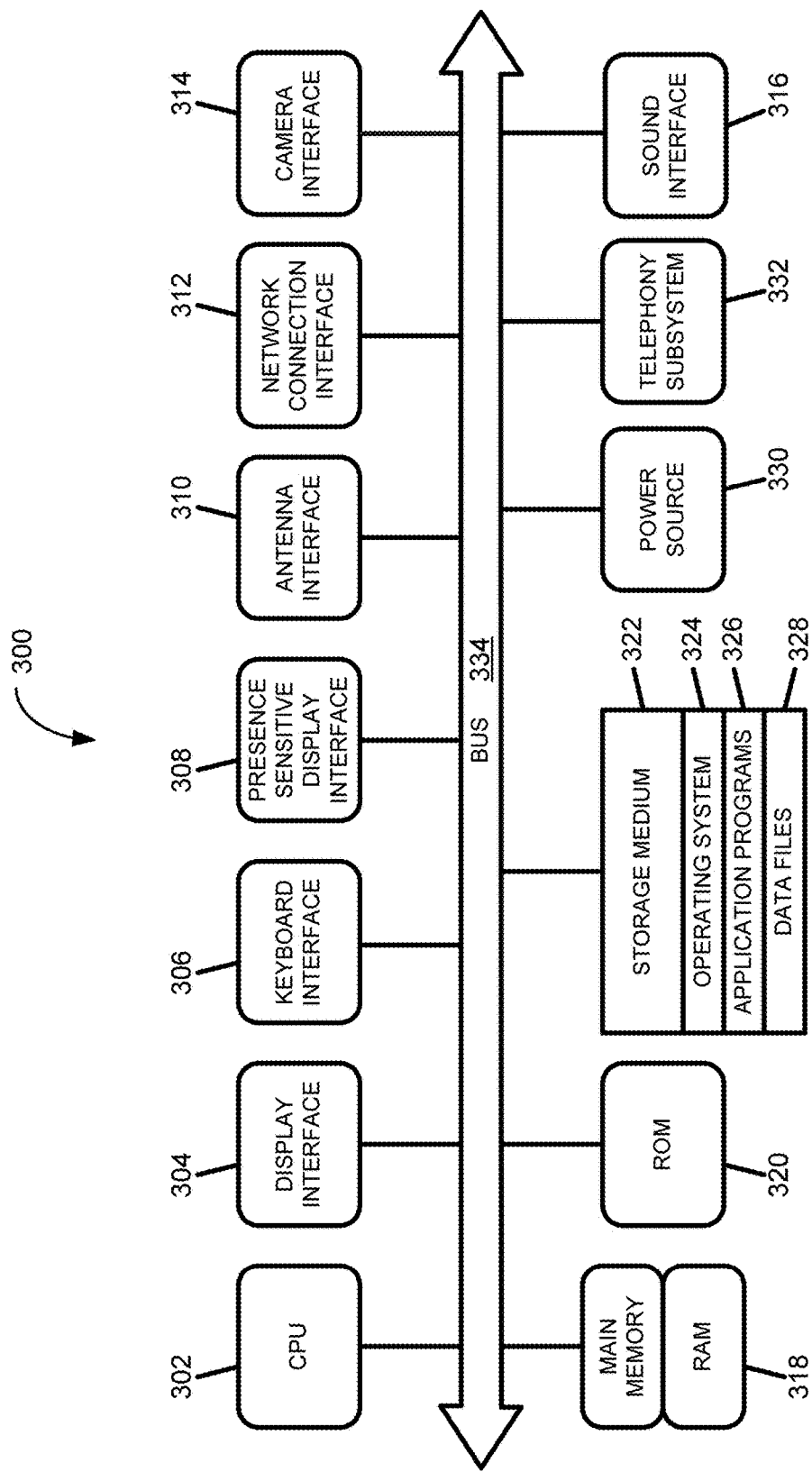
FIG. 3 depicts a block diagram of an illustrative computing device 300 according to an example implementation of the disclosed technology.

FIG. 3 depicts a block diagram of an illustrative computing device 300 according to an example implementation. Certain aspects of FIG. 3 may be embodied in a satellite and/or ground station (for example, the satellite 102 as shown in FIGS. 1 and 2 and/or the ground station 204 as shown in FIG. 2). According to one example implementation, the term "computing device," as used herein, may be a CPU, or conceptualized as a CPU (for example, the CPU 302 of FIG. 3). In this example implementation, the computing device (CPU) may be coupled, connected, and/or in communication with one or more peripheral devices, such as display. In certain implementation, the computing device 300 may be included in a terrestrial base station (such as the ground station 202 as depicted in FIG. 2.) In another example implementation, the term computing device, as used herein, may refer to a processor and associated components, for example that may be installed in or on a satellite.

In an example implementation, the computing device (particularly if representing the ground station) may output content to its local display and may transmit and receive messages via the antenna interface 310, the network connection interface 312, telephony subsystem 332, etc. In example implementation, the computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing unit (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, and other information as previously discussed) for an external/remote display that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

In an example implementation, the network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 300 may include a keyboard interface 306 that provides a communication interface to a keyboard. In one example implementation, the computing device 300 may include a pointing device interface 308 for connecting to a presence-sensitive input interface. According to certain example implementations of the disclosed technology, the pointing device interface 308 may provide a communication interface to various devices such as a touch screen, a depth camera, etc.

The computing device 300 may be configured to use an input device via one or more of input/output interfaces (for example, the keyboard interface 306, the display interface 304, the pointing device interface 308, the antenna interface 310, the network connection interface 312, camera interface 314, sound interface 316, etc.) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Certain example implementations of the computing device 300 may include an antenna interface 310 in communication with an antenna. Certain example implementations of the antenna interface 310 can include one or more of: a receiver, analog-to-digital converter, sampler, buffers, memory, and memory. Certain example implementations can include a network connection interface 312 that provides a communication interface to a network. In certain implementations, a camera interface 314 may act as a communication interface to provide functions for capturing digital images from a camera. In certain implementations, a sound interface 316 is provided as a communication interface for converting sound into electrical signals using a microphone and for converting electrical signals into sound using a speaker. According to example implementations, a random access memory (RAM) 318 is provided, where computer instructions and data may be stored in a volatile memory device for processing by the CPU 302.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and content files 328 are stored. In accordance with certain example implementations of the disclosed technology, the application programs 326 can include one or more of programs to dynamically adjust the various parameters, such as one or more of: data packet size; data chunk size; data coding rate; number of re-transmits on uplink; number of tolerated timeouts; maximum transmission time; data compression parameters; bit rate factors; recovery factors; resource burden factors; batching; latency control; advance filtering; etc., as previously described.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing unit. The RAM 318 interfaces with the computer bus 334 to provide quick RAM storage to the CPU 302 during the execution of software programs such as the operating system application programs, and device drivers.

More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing unit (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example embodiment, the computing device may output content to its local display or speaker(s). In another example implementation, the computing device may output content to an external display device (e.g., over Wi-Fi) such as a TV or an external computing system.

Figure 4:
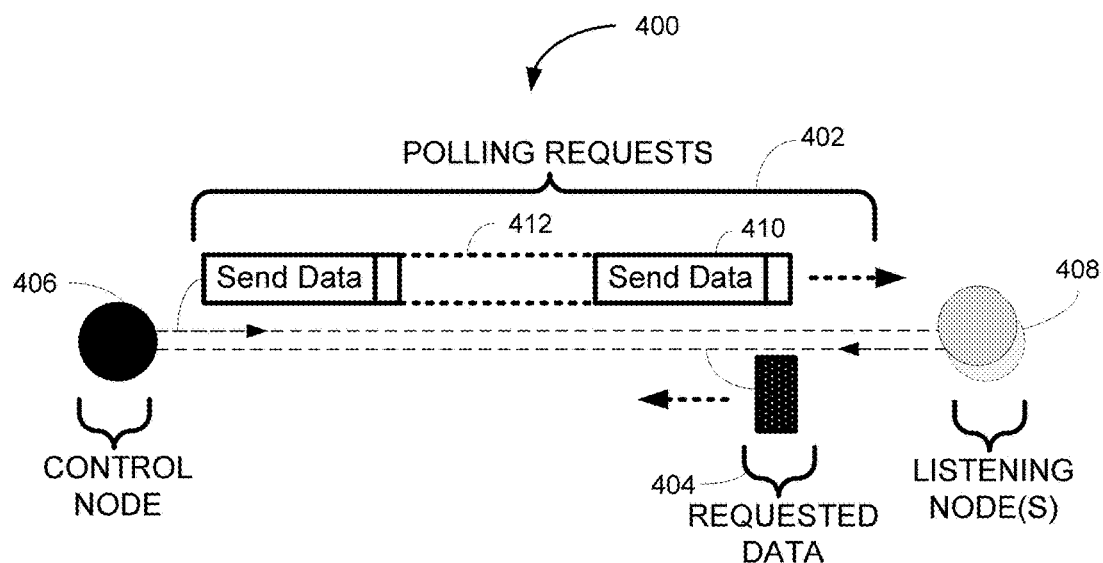
FIG. 4 depicts an example process 400 for polling or requesting data until requested data 404 is received, according to an example implementation of the disclosed technology

FIG. 4 depicts an example polling process 400 for requesting data until requested data 404 is received, according to an example implementation of the disclosed technology. Certain example implementations of this polling process 400 may provide a technical benefit of reducing reliance on communication acknowledgements or handshakes. Certain example implementations of the polling process 400 may further provide the technical benefit of eliminating or reducing certain associated overhead and drawbacks, particularly in satellite systems having limited resources and/or intermittent communications reliability.

In an example implementation, a control node 406 (such as control node 206 as described above with respect to FIG. 2) may be designated as the requesting node of a satellite communication system. As previously described, the node position designation of the control node 406 may be selectively and/or dynamically configured to reside at the satellite, at a separate processor on the satellite, at the ground station, at another satellite, etc. According to an example implementation of the disclosed technology, by configuring the designation or position of the control node 406, one or more listening nodes 408 may be established at any other node position (other than the position occupied by the control node 406). For example, in one embodiment, the control node 406 may be configured to be at the ground station (such as the ground station 204 as described above with respect to FIG. 2) and the listening node 408 may be configured to be at the satellite (such as the satellite 102 as described above with respect to FIG. 1 and FIG. 2). In this example, the control node 406 (ground station) may request download information from the listening node 408 (satellite) by uploading polling requests 402 until the requested data 404 is downloaded and received by the control node 406. In this example implementation, the listening node 408 (satellite) need only receive one of the "send data" 410 instructions to initiate sending of the requested data 404, without having to waste precious battery or time window resources on the various handshakes or acknowledgments. In accordance with an example implementation of the disclosed technology, the control node can continuously poll until the requested data 404 is received.

According to another example implementation of the disclosed technology a satellite may be designated as the control node 406 and the ground station may be designated as the listening node 408. In such an example implementation, the satellite may provide polling requests 402 to the ground station for the requested data 404 (via a download signal) until the requested data 404 is received (via an upload signal) by the control node 406 (satellite). In certain example implementations, the control node 406 (satellite) may poll the listening node 408 (ground station) for requested data 404 using scheduled polling until the requested data is received, at which time that particular polling session may be terminated. For example, the send data 410 instructions may be configured with a predetermined or dynamically configured periods or spacing 412. This may allow the polling requests 402 to be configured such that they are scheduled for download during known time windows, and/or so that they are coordinated with the powering-up of the satellite radio transmitter. In this example implementation, the various resource burdens, as described above, may be used to control the scheduled polling.

Figure 5:
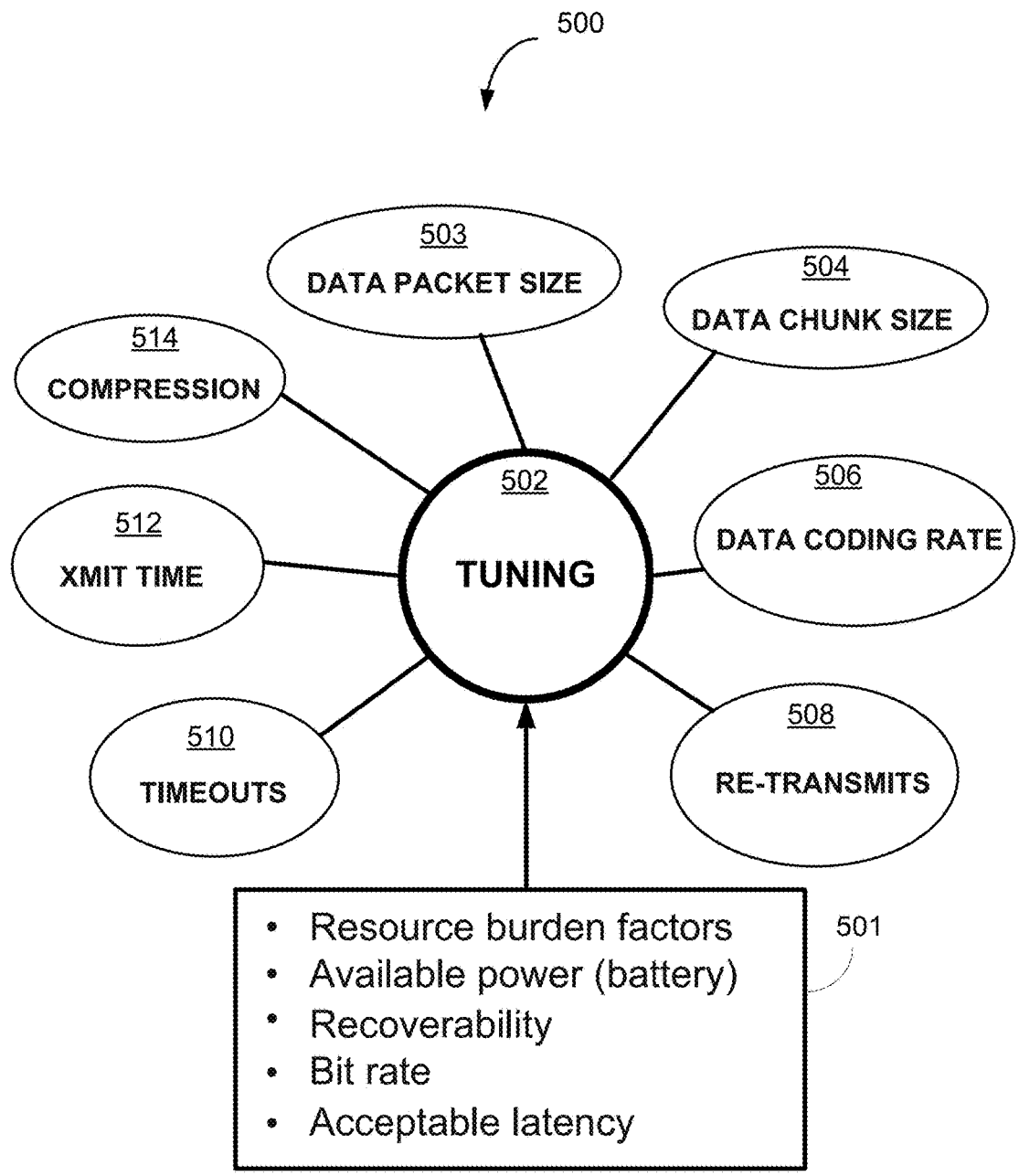
FIG. 5 depicts a STP tuning process 500, according to an example implementation of the disclosed technology

FIG. 5 depicts a STP tuning process 500, according to an example implementation of the disclosed technology. Certain example implementations of the STP tuning process 500 may be implemented by, or in conjunction with, the STP processor(s) (such as via the tuning module 226 in the satellite STP processor 210 and/or the tuning module 227 in ground STP processor 211 as depicted in FIG. 2). According to an example implementation of the disclosed technology, the STP tuning process 500 may be flexible and responsive to one or more input tuning factors 501 related to a satellite communications link. In an example implementation, the input tuning factors 501 may include, but are not limited to resource burden factors, battery power, data recoverability, desired bit rate, acceptable latency, etc., as previously described. According to an example implementation of the disclosed technology, the tuning module 502 may calculate certain output parameters to provide improvements and/or optimizations of the STP communication protocol based on the input tuning factors 501. In an example implementation, the output parameters may be dynamically adjusted based on the input tuning factors 501. According to an example implementation of the disclosed technology, the output parameters may include one or more of: data packet size 503, data chunk size 504, the data coding rate 506, the number of re-transmits 508, the number of tolerated timeouts 510, the maximum transmission time 512, and/or the compression parameters 514.

As may be recognized by those having skill in the art, the output parameters, as described herein, may affect one or more performance aspects, such as latency, bit error rates, an ability to recover corrupted data, burden on resources, etc. In some embodiments, the output parameters may correlate with more than a single resulting performance aspect of the satellite communications link, and therefore, the process carried out by the tuning module 502 may include trade-offs to the adjustment of the above-referenced parameters to achieve a balanced result. For example, if low latency is the top priority (such as may be the case with AIS messages), the data packet size 503 and/or the data chunk size 504 may be adjusted for small values by the tuning module 502, while allowing a large number of timeouts 510. In another example implementation, if minimizing the drain on the battery is a priority, the transmit time 512 and number of timeouts 510 may be set to low values by the tuning module 502.

In accordance with an example implementation of the disclosed technology, the input tuning factors 501 may be utilized to affect and/or improve communications efficiency associated with certain aspects of the satellite communications system, as disclosed herein. For example, an effective bit-rate can be influenced by a number of factors including but not limited to noise, re-transmission of data due to errors, transmit power, error correction encoding/decoding, etc. Certain example implementations of the disclosed technology may provide a flexible, tunable communication protocol that can improve communications efficiency, for example, via tuning 502 one or more of the various output parameters 503 504 506 508 510 512 514.

Figure 6:
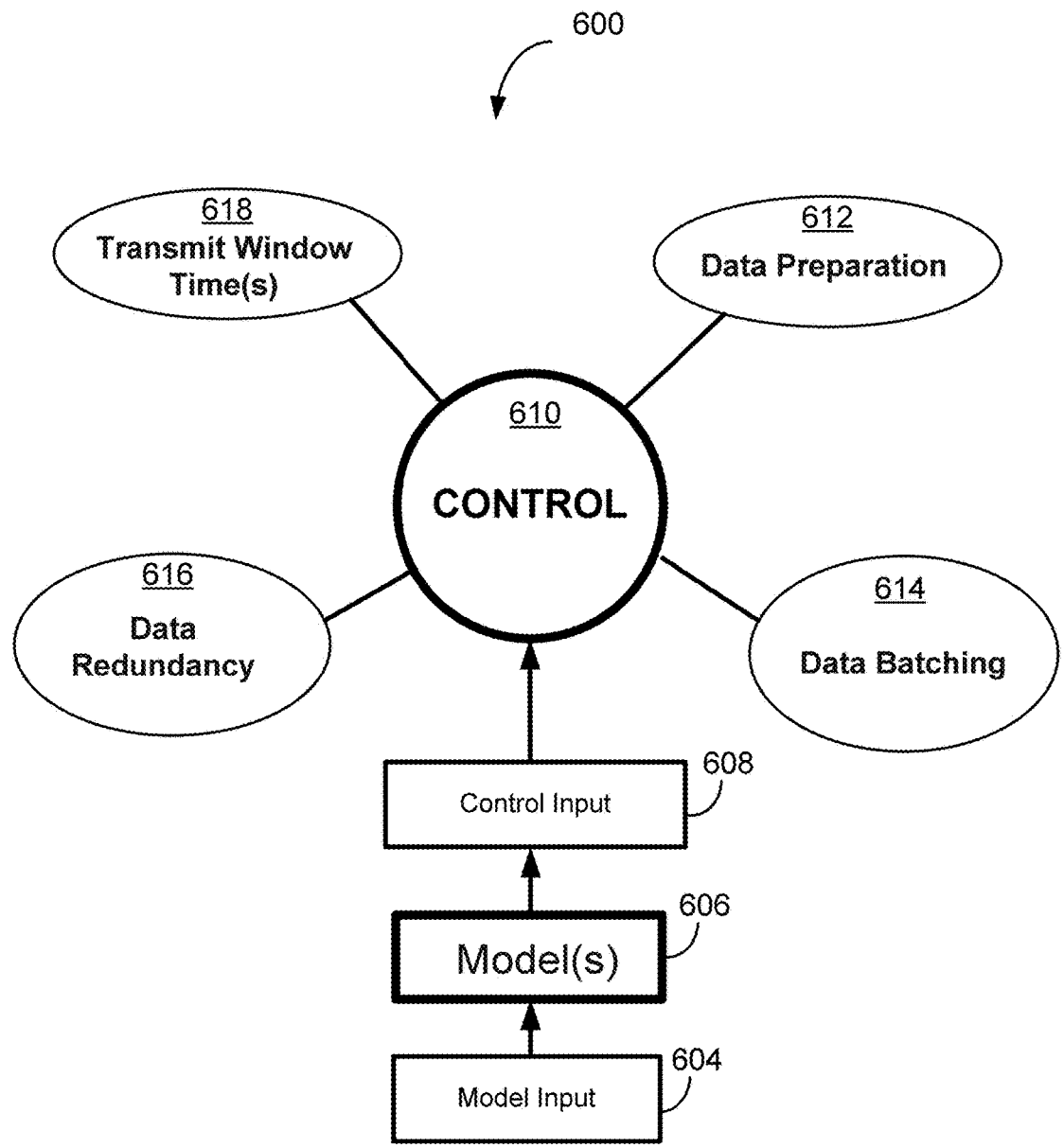
FIG. 6 depicts a STP control process 600, according to an example implementation of the disclosed technology.

FIG. 6 depicts a STP control process 600, according to an example implementation of the disclosed technology. Certain example implementations of the STP control process 600 may work in conjunction with the STP tuning process 500, as describe above with respect to FIG. 5. Certain example implementations of the STP control process 600 may be implemented by, or in conjunction with, an STP processor (such as via the control module 228 in the satellite STP processor 210 and/or the control module 229 in ground STP processor 211 as depicted in FIG. 2). According to an example implementation, one or more models 606 may be utilized to calculate control input 608 to a control module 610 for adjustment of one or more of the parameters 612 614 616 618 of the STP to provide improvements and/or optimizations of the satellite communications link. For example, based on the one or more models 606, the control module 610 can decide whether to re-instruct the satellite to transmit data. In another example implementation, and based on the one or more models 606, the control module 610 may instruct the satellite when to start and/or stop transmitting. In certain example implementations, one or more of the model(s) 606, associated processor(s), and/or the control module 610 may be located either on the ground station side or on the satellite side.

As shown in FIG. 6, and according to an example implementation of the disclosed STP control process 600, a bit error rate (BER) history of a satellite communication link may be utilized as model input 604 for the one or more models 606, for example, to calculate an expected BER as control input 608 for the control module 610. In another example implementation, the one or more models 606 may be utilized to calculate as control input 608, a probability that a request was not received based on model input 604 such as a number of packets received versus those requested. In another example implementation, the one or more models 606 may be utilized to calculate as control input 608, an estimation of time that a request will take to be fulfilled versus actual time elapsed. Accordingly, one or more of these calculations may be used as input control module 610 of the STP. According to an example implementation of the disclosed technology, the control module 610 may output one or more of the following control parameters, based on one or more of the above-referenced calculations: data preparation 612; data batching 614; data redundancy 616; and transmit window time(s) 618.

As an illustrative example, the control input 608 to the control module 610, such as an expected BER, may be calculated by the model(s) 606 based on BER history as model input 604. The model input 604 may include additional information, such as a satellite elevation angle, etc. Accordingly, an expected BER as a function of satellite elevation may be used as control input 608 to the control module 610. Such control input 608 information may, for example, be used to initiate data preparation 612 prior to transmission. In this respect of the disclosed technology, the data may be pre-prepared in anticipation of a suitable transmit window time 618 so that communications can commence without taking valuable time to process the data.

In accordance with certain example implementations, the STP control process 600, as disclosed herein may be configured to handle various situations that may otherwise result in data transfer errors or failure. For example, the control module 610 may be configured to handle situations such as interruption of the transmission, failure at the receiving node, failure at the transmitting node, significant data packet loss, and/or factors that cause unusable data, and may be logged as a part of the BER history and used as model input 604. Certain example implementations of the control module 610 may be used to adjust one or more of the data preparation 612, data batching 614, forward error correction (FEC) via data redundancy 616, and/or transmit window time(s) 618 parameters accordingly. For example, the model(s) 606 may be used to determine where an interruption occurred in the data stream. In response, the control module 610 may batch, resume, and/or retransmit the data to recover data loss due to the interruption.

In certain example implementations, the model(s) 606 may be utilized to determine an expected recoverability of data. In certain implementations, the control module 610 may adjust data redundancy 616, for example, by FEC encoding to achieve target recoverability. Additional factors, such as noise, limited communications window, timeliness of the data, importance of the data, etc., may be utilized by the control module 610 to adjust the data redundancy 616.

In accordance with an example implementation of the disclosed technology, the control module 610 may be utilized to adjust the transmit window time(s) 618 based on various input. For example, as discussed above, the satellite elevation may be input to the control module 610 and may be used to initiate transmission in a suitable (or optimum) transmit window 618.

As may be recognized by those having skill in the art, the various controlled parameters, as described herein, may affect one or more performance aspects associated with satellite communications. Certain control parameters may correlate with more than a single resulting performance aspect, and therefore, may include a simultaneous trade-off approach to the adjustment of the above-referenced parameters to achieve a balanced result. For example, if retransmission of data is assigned a high penalty cost (as may be the case with limited battery power), the data redundancy 616 may be controlled to include robust error correction that may be balanced with the penalty cost associated with the extra (redundant) data. In another example implementation, if utilization of the optimum window time is assigned a high priority, then data preparation 612 may be scheduled so that the transmission can occur during low loss/error portions of the window, such as during a certain range of satellite elevation with respect to the ground station.

Various descriptions have been provided herein for the designation of a particular node in a satellite communications system as a control node, while one or more of the other associated nodes become listening nodes. Examples of the control node designations, in accordance with certain example implementations of the disclosed technology, are shown in FIG. 7A and FIG. 7B.

Figure 7A:
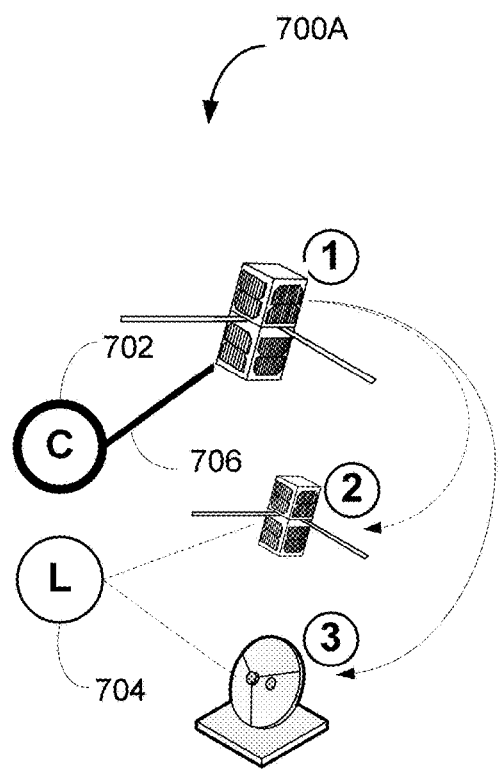
FIG. 7A depicts the designation of a first communication node in a satellite communication system 700A as a control node 702, with corresponding designations of remaining second and third communication nodes as listening nodes 704, according to an example implementation of the disclosed technology.

FIG. 7A depicts a satellite communications system 700A in which first communication node (such as a satellite or a processor on the satellite) is designated 706 as a control node 702. Responsive to the designation 706, one or more of a second communication node (such as another satellite, if present and part of the system) and/or a third communication node (such as a ground station) in the system 700A may be designated as a listening node 704, according to an example implementation of the disclosed technology. In this example implementation, the first communication node provides instructions, while the remaining node(s) listen(s) for the instructions and responds accordingly.

Figure 7B:
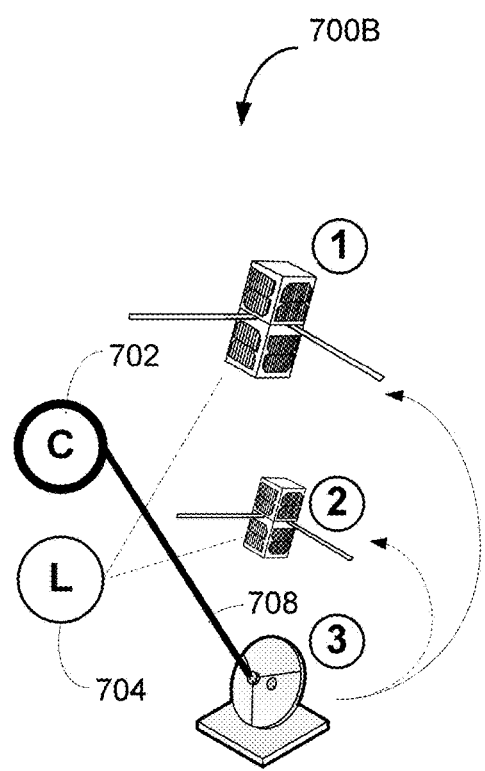
FIG. 7B depicts the designation of a third communication node in a satellite communication system 700B as a control node 702, with corresponding designations of the remaining first and second communication nodes as listening nodes 704, according to an example implementation of the disclosed technology.

FIG. 7B depicts the designation 708 of a third communication node in a satellite communication system 700B (which may be the same as system 700A) as a control node 702, with corresponding designations of remaining first and second communication nodes as listening nodes, according to an example implementation of the disclosed technology. In a similar process as described above with respect to FIG. 7A, the third communication node (designated as the control node 702) provides instructions, while the remaining nodes listen for the instructions and respond accordingly.

Figure 8:
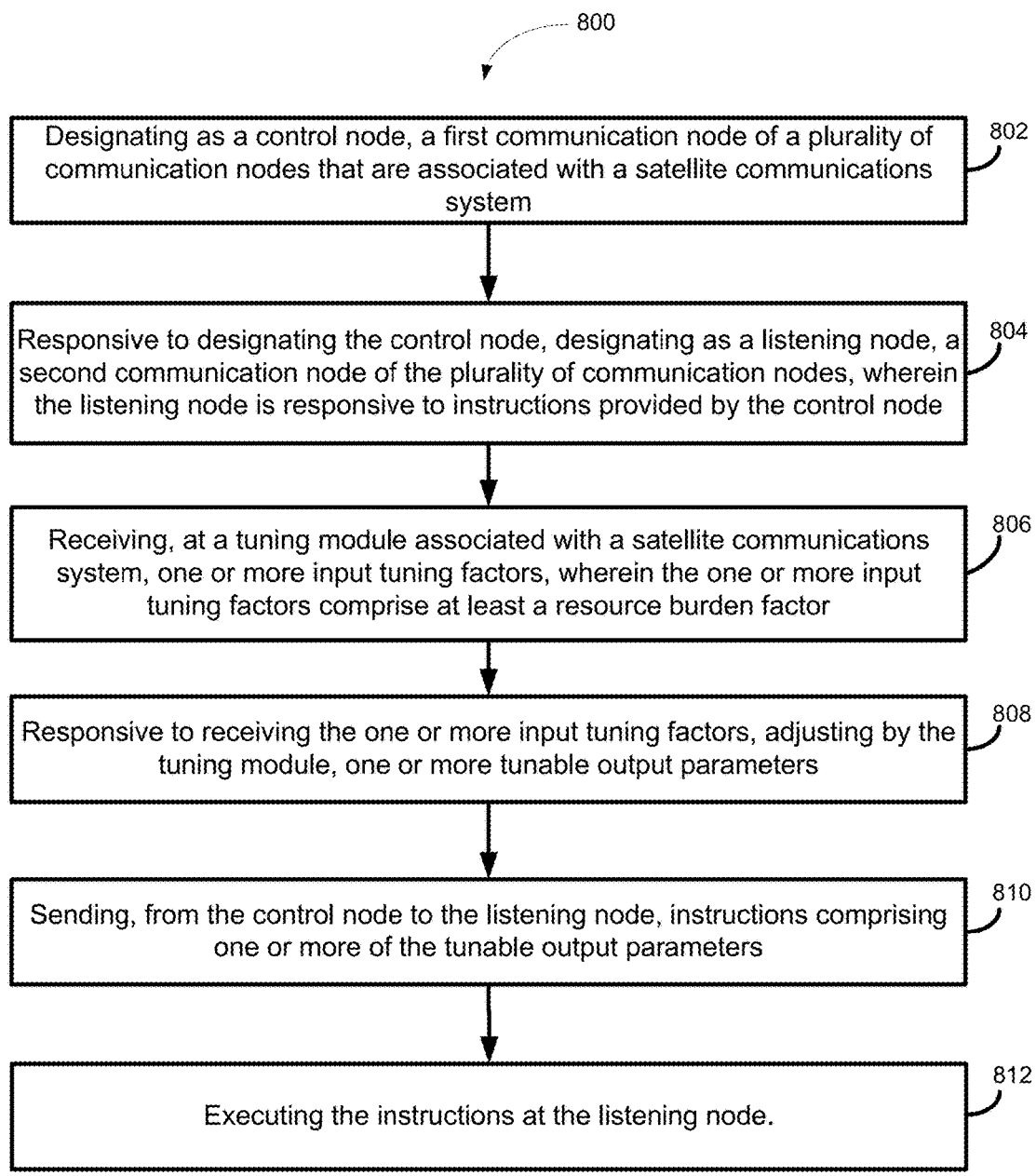
FIG. 8 is a flow diagram of a method 800 according to an example implementation of the disclosed technology.

FIG. 8 is flow diagram of a method 800, according to an example implementation of the disclosed technology. In block 802, the method 800 includes designating as a control node, a first communication node of a plurality of communication nodes that are associated with a satellite communications system. In block 804, and responsive to designating the control node, the method 800 includes designating as a listening node, a second communication node of the plurality of communication nodes, wherein the listening node is responsive to instructions provided by the control node. In block 806, the method 800 includes receiving, at a tuning module associated with a satellite communications system, one or more input tuning factors, wherein the one or more input tuning factors comprise at least a resource burden factor. In block 808, and responsive to receiving the one or more input tuning factors, the method 800 includes adjusting by the tuning module, one or more tunable output parameters. In block 810, the method 800 includes sending, from the control node to the listening node, instructions comprising one or more of the tunable output parameters. In block 812, the method 800 includes executing the instructions at the listening node Certain example implementations can include preparing data for transmission based at least in part on one or more of the tunable output parameters.

In certain example implementations, the input tuning factors can further include one or more of: desired bit-rate, available battery power, desired latency, and a data recoverability factor.

In an example implementation, the one or more tunable output parameters can include one or more of: data packet size, data chunk size; data coding rate, maximum re-transmit number, maximum timeouts, maximum transmission time, data compression parameters, and error correction parameters.

According to an example implementation of the disclosed technology, the first communication node is associated with a satellite and the second communication node is associated with a ground station, wherein the satellite is configured for data communications with the ground station.

According to another example implementation of the disclosed technology, the first communication node is associated with a ground station and the second communication node is associated with a satellite, wherein the ground station is configured for data communications with the satellite.

In certain example implementations, the tuning module resides at the control node. In an example implementation, designating the control node can include dynamically designating the control node.

In an example implementation, the tuning module may be configured for communication with a Space Tolerant Protocol processor associated with the control node.

In an example implementation, designating the listening node can include designating as a listening node, a third communication node of the plurality of communication nodes.

In an example implementation, the satellite communications system is a satellite-based Automatic Identification System (S-AIS). In an example implementation, the satellite communications system is a GPS-RO system.

In accordance with an example implementation of the disclosed technology, the resource burden factor can include information related to use rate or percentage of available battery power. In an example implementation, the resource burden factor can include information related available communications resources, including but not limited to available bandwidth.

Certain example implementations include polling the listening node until the instructions are executed. In certain example implementations, the polling can include continuous polling. In certain example implementations, the polling can include intermittent polling.

Certain example implementations can include dynamically adjusting a forward error correction coding method, coding rate, and/or data redundancy based on an expected error rate. Certain example implementations can include dynamically adjusting the forward error correction based on known or expected noise in the communication channel. Certain example implementations, may dynamically adjust one or more parameters of the forward error correction based on a measurement of a bit error rate.

In the preceding description, numerous specific details have been set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A satellite communications system comprising:
   a plurality of dynamically configurable communication nodes comprising:
      a control node including:
         a first memory for storing data and computer-executable instructions;
         a first processor in communication with the first memory;
         a first receiver in communication with the first processor; and
         a first transmitter in communication with the first processor; and
      a listening node including a second receiver;
   wherein a first communication node of the plurality of dynamically configurable communication nodes is configured as the control node;
   wherein a second communication node of the plurality of dynamically configurable communication nodes is designated as the listening node;
   wherein the first communication node is configured to send to the second communication node, data prepared according to one or more tunable parameters received at the first communication node; and
   wherein the plurality of dynamically configurable communication nodes comprise at least one satellite.

2. The satellite communications system of claim 1, further comprising a terrestrial station configured for communication with one or more of the plurality of dynamically configurable communication nodes, the terrestrial station comprising:
   a second memory for storing data and computer-executable instructions;
   a second processor in communication with the second memory; and
   a network in communication with one or more of the first communication node and the second communication node;
   wherein the terrestrial station is initially configured as the control node.

3. The satellite communications system of claim 2, wherein terrestrial station is dynamically designated as the control node, and a first ground station is designated as the listening node.

4. The satellite communications system of claim 2, wherein a first ground station is dynamically designated as the control node, and the terrestrial station is designated as the listening node.

5. The satellite communication system of claim 1, wherein the listening node is a receive-only ground station.

6. The satellite communications system of claim 1, wherein a first ground station is dynamically designated as the control node, and the at least one satellite is dynamically designated as the listening node.

7. The satellite communications system of claim 1, wherein the at least one satellite is dynamically designated as the control node, and a first ground station is designated as the listening node.

8. The satellite communications system of claim 1 wherein the at least one satellite is dynamically designated as the control node, and wherein a second satellite is designated as the listening node.

9. The satellite communications system of claim 1, wherein the one or more tunable parameters comprise one or more of: data packet size, data chunk size; data coding rate, maximum re-transmit number, maximum timeouts, maximum transmission time, data compression parameters, and error correction parameters.

10. The satellite communications system of claim 1, wherein the first communication node is further configured to send to the second communication node, data prepared according to one or more of: use rate of available battery power, use rate of available communications bandwidth, and available window for communications.

11. The satellite communications system of claim 1, wherein the plurality of dynamically configurable communication nodes are part of one or more of a satellite-based Automatic Identification System (S-AIS) and a GPS Radio Occultation (GPS-RO) system.

12. The satellite communications system of claim 1, wherein the listing node is configured to poll the control node for the instructions.

13. The satellite communications system of claim 1, wherein the first processor is configured to dynamically adjust a forward error correction coding rate based on an expected error rate.

14. A satellite communications system, comprising:
   a satellite dynamically designated as a control node, the satellite comprising;
      a first memory for storing data and computer-executable instructions;
      a first processor in communication with the first memory;
      a first receiver in communication with the first processor; and a first transmitter in communication with the first processor; and a receive-capable ground station designated as a listening node, the receive-capable ground station comprising:

a second memory for storing data and computer-executable instructions;

a second processor in communication with the second memory; and a second receiver in communication with the second processor; and wherein the control node is configured to send to the listening node, data prepared according to one or more tunable parameters.

15. The satellite communication system of claim 14, wherein the one or more tunable parameters are received by the control node.

16. The satellite communication system of claim 14, wherein the one or more tunable parameters are generated by the control node.

17. The satellite communication system of claim 14, wherein the data is prepared according to one or more of data batching, forward error correction via data redundancy, and transmit window time.

18. The satellite communications system of claim 14, wherein the one or more tunable parameters comprise one or more of: data packet size, data chunk size; data coding rate, maximum re-transmit number, maximum timeouts, maximum transmission time, data compression parameters, and error correction parameters.

19. The satellite communications system of claim 14, wherein the control node is further configured to send to the receive-capable ground station, data prepared according to one or more of: use rate of available battery power, use rate of available communications bandwidth, and available window for communications.

20. The satellite communications system of claim 14, wherein the satellite and the receive-capable ground station are part of one or more of a satellite-based Automatic Identification System (S-AIS) and a GPS Radio Occultation (GPS-RO) system.

* * * * *